Sept. 27, 1927.  
J. Q. SHUNK  
1,643,423  
MATERIAL DISPENSING MEANS FOR POISONING MACHINES  
Filed March 24, 1927

INVENTOR  
J. Q. Shunk.  
BY  
Albert E. Dieterich  
ATTORNEY

Patented Sept. 27, 1927.

1,643,423

UNITED STATES PATENT OFFICE.

JOHN Q. SHUNK, OF BUCYRUS, OHIO.

MATERIAL-DISPENSING MEANS FOR POISONING MACHINES.

Application filed March 24, 1927. Serial No. 178,104.

My invention relates to certain new and useful improvements in the hopper unit employed in poison dispensing machines of the type where a fan takes the poison powder or dust from a tunnel in which it is deposited from the hopper or other reservoir, and blows it onto trees and plants as the apparatus is conveyed along the ground.

Primarily the present invention has for its object to provide an improved hopper and feeding device for delivering the poison powder or dust into the tunnel that connects with the suction-blower, and to that end the invention comprises a hopper with one or more (preferably a plurality) openings, controlled by a sliding gate, through which the powder falls into the tunnel and is taken up by the air stream passing through the tunnel under the action of the suction-blower, the hopper containing, adjacent the discharge or bottom portion, a rotating agitator shaft with stirring arms and blades for agitating the material within the hopper and prevent its becoming packed, the shaft also having cams or trips which act on resilient members, alternately raising and releasing the same, the said resilient members having impact elements or fingers acting as tappets when the resilient members are raised and released so as to impact and jar the bottom of the hopper in the vicinity of the discharge holes to insure the materials passing through the holes without blocking the same; the resilient members also serve as agitators for agitating the contents of the hopper and assist the rotary agitator arms in the performance of this function.

The invention further resides in those novel features of construction, combination and arrangement of parts, all of which will be first fully described, then be specifically pointed out in the appended claims, reference being had to the accompanying drawing, in which:—

Figure 1:
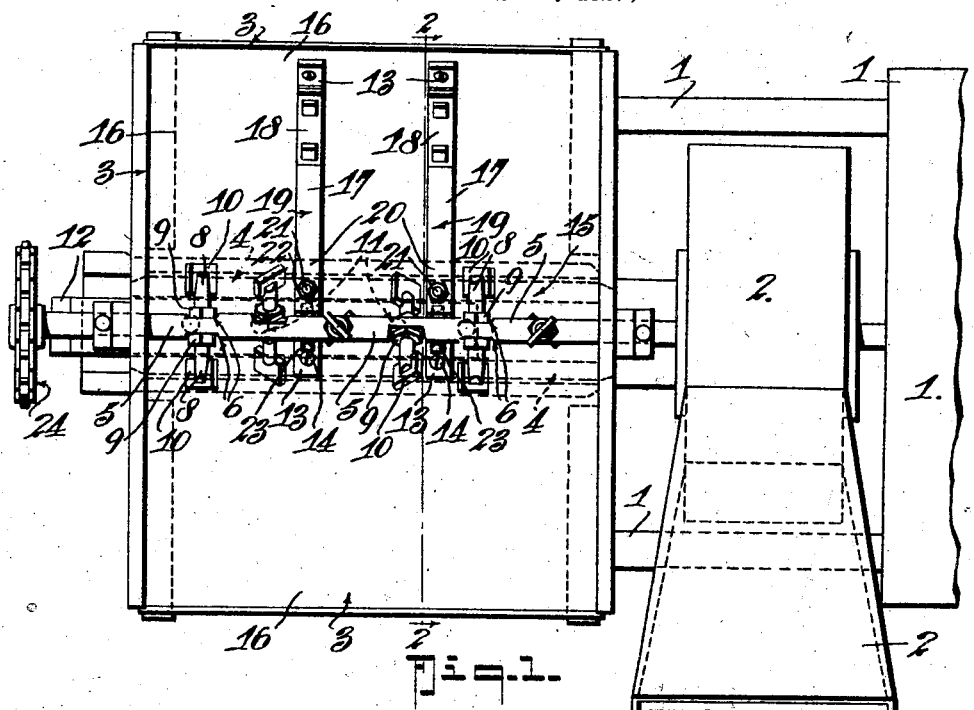
Figure 1 is a plan view of a portion of a machine embodying my invention.
Figure 2:
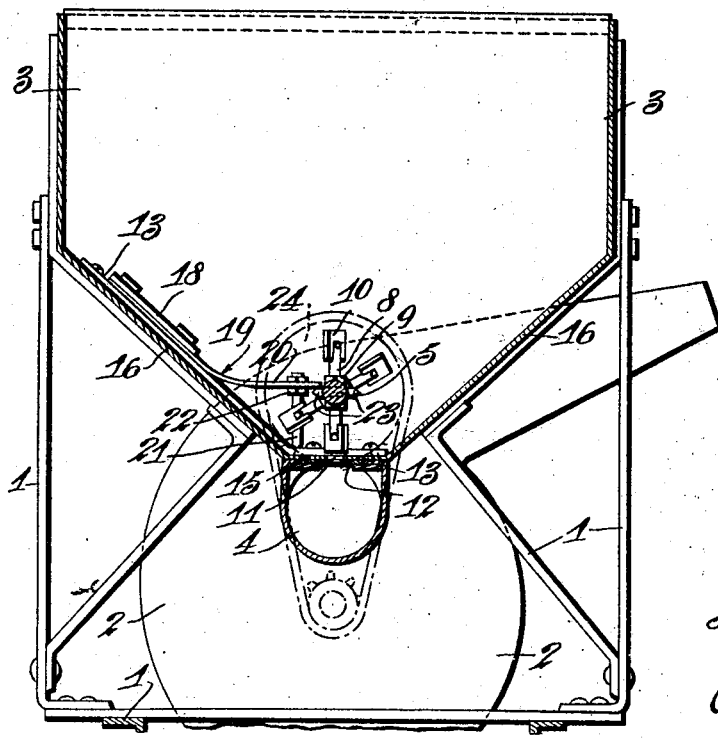
Figure 2 is a cross section on the line 2—2 of Figure 1.
Figure 3:
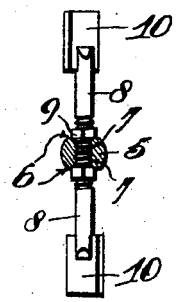
Figure 3 is a detail cross section on the line 3—3 of Figure 1.

In the drawing in which like numerals of reference indicate like parts in all the figures, 1 represents the machine on which the hopper 3 and blower 2 are located. 4 represents the inlet duct or tunnel which delivers to the blower and into which the poison dust is deposited from the hopper.

Mounted in suitable bearings on the end walls of the hopper is the agitator shaft 5 having flattened portions 6 at intervals and threaded holes 7 for the agitator arms 8 and jam nuts 9 which serve to secure the arms to the shaft. The arms 8 carry paddles or blades 10 preferably inclined as indicated. 11 designates the outlets in the bottom of the hopper 3, the outlets being controlled by a slide valve or gate 12.

Bars 13 are secured by screws 14, or in any other desired manner, to the bottom 15 of the hopper and extend up one side wall 16 to which these bars are also secured. 17 indicates resilient bars secured at 18 to the bars 13 and hopper side wall 16, and the bars 17 are bent at 19 to provide horizontal portions 20 which extend into proximity with the agitator shaft 5 and carry tappet finger bolts and nuts 21—22 respectively, the tappet finger bolts being designed to impact that portion of the respective fixed bars 13 at the bottom of the hopper to jar the hopper bottom for a purpose presently explained.

The agitator shaft is provided with a suitable number of cams 23 which are associated with the free ends of the resilient bars 17 for the purpose of alternately raising and releasing those ends, thereby actuating the tappet fingers.

A suitable driving gear 24 obtains its power from any suitable source to drive the agitator shaft while the machine is in operation.

From the foregoing it will be seen that the hopper when filled with suitable material and the discharge openings uncovered by the slide valve to the degree desired, will deposit the powder or dust into the tunnel or duct 4 in a uniform manner. The rotation of the agitator shaft, through the action of the agitator arms and blades in co-operation with the vibrating motion of the flat free ends 20 of the resilient bars will break up any tendency of the material to pack or bridge in the hopper while the tappet-effect of the fingers 21 will serve to impart a jar or shock to the hopper structure, particularly the bottom, and dislodge any powder that may tend to block an outlet.

From the foregoing description, taken in connection with the accompanying drawing, it is thought the complete construction, operation and advantages of my invention will be clear to those skilled in the art to which it relates.

What I claim is:

1. In apparatus of the class described, a hopper having a bottom provided with discharge openings, a rotatable agitator shaft within the hopper, said shaft having a cam, a resilient bar secured at one end to the hopper wall and having its other end associated with said cam whereby rotation of the shaft will cause said cam to trip said bar, and a tappet finger carried by said bar to impact the hopper.

2. In apparatus for delivering powder, a hopper having a bottom provided with a row of outlet holes and a slide valve controlling the same, a rotatable agitator shaft mounted in bearings on said hopper and projecting through the same, arms with agitator paddles carried by that portion of the shaft within the hopper, a cam on said shaft between adjacent arms, and a tappet device mounted in the hopper and operated by said cam for agitating the contents of the hopper directly and by tapping action against a wall of the hopper.

3. In apparatus for delivering powder, a hopper having a bottom provided with a row of outlet holes and a slide valve controlling the same, a rotatable agitator shaft mounted in bearings on said hopper and projecting through the same, arms with agitator paddles carried by that portion of the shaft within the hopper, a cam on said shaft between adjacent arms, and a tappet device mounted in the hopper and operated by said cam for agitating the contents of the hopper directly and by tapping action against a wall of the hopper, said tappet device comprising an impact receiving member and a resilient arm having a tapping finger adapted to engage said impact receiving member for the purpose specified.

4. In combination with a hopper having converging side walls, a bottom and end walls, the bottom having holes covered by slide valves; an agitator shaft journalled in bearings in the end walls, radial arms with paddles mounted on the agitator shaft, cam means on the shaft between adjacent arms, a fixed bar secured to the bottom and a side of the hopper, a resilient bar secured at one end to said fixed bar, and having its other end free and projected between adjacent agitator arms into association with said cam, finger bolts secured to said free end and adapted to engage a portion of said fixed bar as a tappet, said cam adapted to raise and release said free end to cause said finger to function as a tappet and to cause said free end to act as a vibrating agitator.

5. In combination with a hopper having converging side walls, a bottom and end walls, the bottom having holes covered by slide valves; an agitator shaft journalled in bearings in the end walls, radial arms with paddles mounted on the agitator shaft, cam means on the shaft between adjacent arms, a fixed bar secured to the bottom and a side of the hopper, a resilient bar secured at one end to said fixed bar and a portion lying in separable contact with said fixed bar, and having its other end free and projected between adjacent agitator arms into association with said cam, finger bolts secured to said free end and adapted to engage a portion of said fixed bar as a tappet, said cam adapted to raise and release said free end to cause said finger to function as a tappet and to cause said free end to act as a vibrating agitator.

JOHN Q. SHUNK.